United States Patent [19]

Masunaga et al.

[11] Patent Number: 4,635,123
[45] Date of Patent: Jan. 6, 1987

[54] IMAGE PICK-UP DEVICE FOR USE WITH AN ILLUMINATING DEVICE

[75] Inventors: Makoto Masunaga; Nobuo Tezuka, both of Tokyo, Japan

[73] Assignee: Canon Kabushiki Kaisha, Tokyo, Japan

[21] Appl. No.: 467,368

[22] Filed: Feb. 17, 1983

[30] Foreign Application Priority Data

Feb. 26, 1982 [JP] Japan .................... 57-31224
Feb. 26, 1982 [JP] Japan .................... 57-31226
Feb. 26, 1982 [JP] Japan .................... 57-31227
Feb. 26, 1982 [JP] Japan .................... 57-31229

[51] Int. Cl.$^4$ .................................. H04N 3/14
[52] U.S. Cl. .................................. 358/213; 358/909
[58] Field of Search .............. 358/213, 211, 909, 212, 358/209; 315/151; 354/149.11

[56] References Cited

U.S. PATENT DOCUMENTS 4,189,751  2/1980  Nagumo ............................. 358/213
4,298,826 11/1981  Nakayama ......................... 315/151
4,357,087 11/1982  Ikawa et al. ..................... 354/149.11
4,423,436 12/1983  Kimura ............................. 358/211

Primary Examiner—Gene Z. Rubinson
Assistant Examiner—Stephen Brinich
Attorney, Agent, or Firm—Fitzpatrick, Cella, Harper & Scinto

[57] ABSTRACT

An image pick-up device using image pick-up device having a photoelectric converting portion and a memory portion for storing therein image information formed in the converting portion, and a light source for illuminating an object to be photographed, has an inhibiting device for inhibiting the light emission of the light source while the image information in the photoelectric converting portion is transferred to the memory portion. The amount of accumulation after the accumulation of image signals in the image pick-up device is started is discriminated and control is effected such that the illuminating light source is caused to functionally act when the amount of accumulation does not reach a predetermined amount.

81 Claims, 18 Drawing Figures

IMAGE PICK-UP DEVICE FOR USE WITH AN ILLUMINATING DEVICE

BACKGROUND OF THE INVENTION

1. Field of the Invention

This invention relates to a combination system of an illuminating device and an image pick-up device and to improvements in the illuminating device and the image pick-up device.

2. Description of the Prior Art

Generally, an image pick-up element such as a CCD has a photoelectric converting portion and a memory portion as a buffer memory for temporarily accumulating therein image information formed in the converting portion.

In a frame transfer type CCD, for example, the photoelectric converting portion is used as a transfer path for transferring the charge in the photoelectric converting portion to the memory portion and therefore, a time equal to the number of picture elements in the vertical direction of the photoelectric converting portion divided by the CCD driving frequency is required for the transfer period. That is, assuming that the number of vertical picture elements is 500 and the driving frequency is 10 MHz, a time of 50 μsec. is necessary.

Where the image of an ordinary object is to be picked up, the quantity of light entering the photoelectric converting portion as the transfer path during this transfer period is negligibly small. However, where image pick-up is effected by the use of an auxiliary illuminating light source, very intense light may enter within a short time.

For example, assuming a flashlight source like a popular strobe light source as the illuminating light source, a time of about 20 μsec. is required until a peak is reached after triggering and thereafter a trail of about 1.8 msec. is left, as shown in FIG. 1 of the accompanying drawings.

Accordingly, if the light source emits light when one-half of the picture element signal in the vertical direction, as shown in FIG. 2 of the accompanying drawings, has been transferred from the photoelectric converting portion 1 to the memory portion 2, the upper half 3 of the picture plane under transfer will become light and the lower half 4 will become dark.

Such a phenomenon is more liable to occur not only in the case of the strobe light source as described above but also in the case of any auxiliary light source as the quantity of emitted light is greater and the period of light emission is longer.

On the other hand, in the case of the conventional image pick-up elements such as the CCD, no shutter is provided forwardly of the light-receiving surface thereof and therefore, there is no limitation on the exposure time associated with the opening-closing speed of the shutter.

It is possible also to reduce the image accumulating time in the photoelectric converting portion to, for example, the order of one several hundredsth of a second, i.e., the order of one to several msec., and this is a feature of the image pick-up device using such image pick-up elements.

However, the shorter the accumulating time is made in this manner, the more liable to occur is brightness irregularity of the picture plane due to the auxiliary light source as shown in FIG. 2.

Also, where the object to be photographed is very dark, it is impossible to render the exposure amount optimum solely by control of the accumulating time and the diaphragm. Thus, an auxiliary illuminating light source becomes necessary and in that case, heretofore, the brightness of the object has been detected by a sensor such as an SPC (silicon photo cell) and adjustment or the like of the illuminating device has been effected on the basis of the output of such sensor, but this would complicate the construction for detecting the brightness of the object.

SUMMARY OF THE INVENTION

It is an object of the present invention to provide a combination system of an image pick-up device and an illuminating device, or an image pick-up device and an illuminating device, which can eliminate the above-noted disadvantages peculiar to the prior art.

It is another object of the present invention to provide a system having such an illumination timing which will cause no picture plane irregularity in the image pick-up device when the illuminating device and the image pick-up device are used in combination.

It is still another object of the present invention to provide a system which permits adjustment of the quantity of illuminating light to be simply accomplished by effectively utilizing the image pick-up device.

It is still another object of the present invention to provide a system which can set the illuminating device to a preparatory condition in accordance with the image pick-up condition of the image pick-up device.

It is a further object of the present invention to provide a system which automatically effects illumination in accordance with the image pick-up condition of the image pick-up device.

It is still a further object of the present invention to provide a system which effects a display indicative of whether illumination is necessary in accordance with the image pick-up condition of the image pick-up device.

To achieve such objects, in an embodiment of the present invention, inhibiting means is provided for inhibiting the light emission of a light source during the vertical transfer period to prevent entry of light during such period.

Moreover, light emission is started in synchronism with the initiation of the accumulation of image information in the photoelectric converting portion to enhance the effectiveness of light emission.

Also, in an embodiment of the present invention, means is provided for automatically operating a flashlight unit when the signal integrating time of image pick-up means for ensuring an image pick-up signal of a predetermined level exceeds a predetermined time.

Other objects and features of the present invention will become apparent from the following detailed description thereof taken in conjunction with the accompanying drawings.

DETAILED DESCRIPTION OF THE PREFERRED EMBODIMENTS

The present invention will hereinafter be described in detail with respect to some embodiments thereof.

Figure 1:
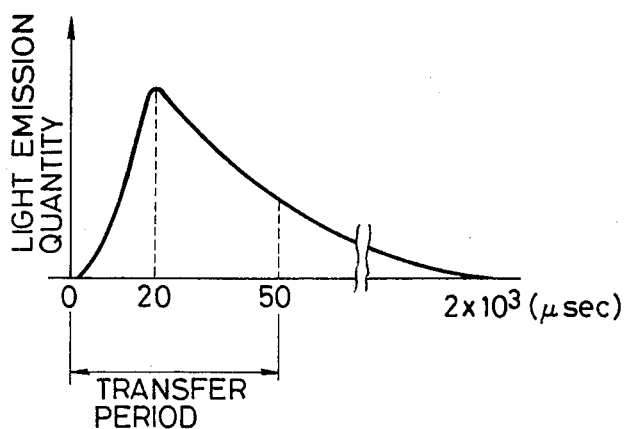
FIG. 1 illustrates an example of the characteristic of an illuminating light source applicable to the present invention.
Figure 2:
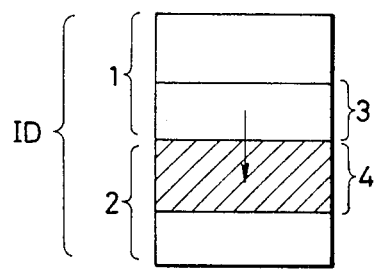
FIG. 2 illustrates the disadvantages peculiar to the prior art.
Figure 3:
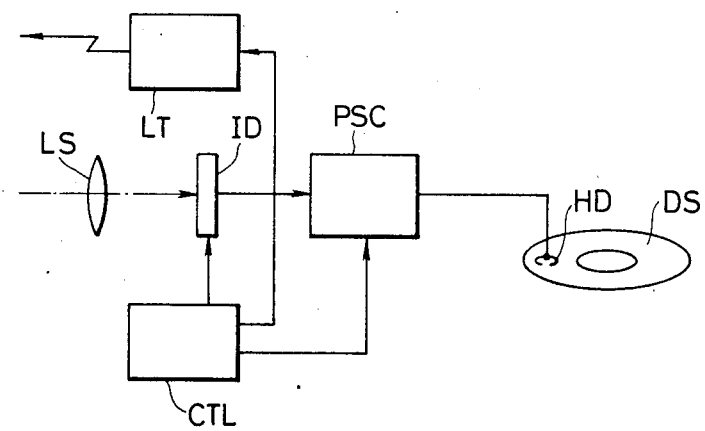
FIG. 3 shows a first embodiment of the present invention.

Referring to FIG. 3 which is a block diagram showing a first embodiment of the present invention, LS designates an image pick-up optical system, ID denotes an image pick-up element, LT designates an illuminating light source, CTL denotes a control circuit, PSC designates a signal processing circuit, HD denotes a head and DS designates a disc-like recording medium.

Figure 4:
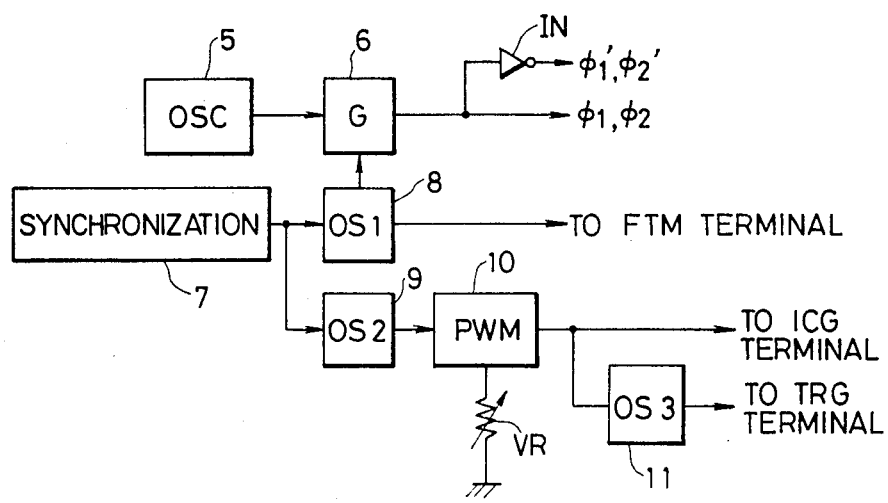
FIG. 4 shows an example of the construction of the essential portions of the first embodiment.

FIG. 4 shows an example of the essential portion of the control circuit CTL shown in FIG. 3. In FIG. 4, reference numeral 5 designates an oscillator which puts out, for example, a pulse signal of 10 MHz. Reference numeral 6 denotes a gate circuit, reference numeral 7 designates a synchronizing signal generating circuit which puts out, for example, a signal of period of 1/60 sec., reference numerals 8 and 9 designate one-shot circuits synchronous in rising, reference numeral 10 denotes a pulse width modulating circuit, and VR designates setting means for setting the duty cycle of the output of the pulse width modulating circuit. Reference numeral 11 denotes a one-shot circuit synchronous in falling, and IN designates an inverting circuit.

Figure 5A:
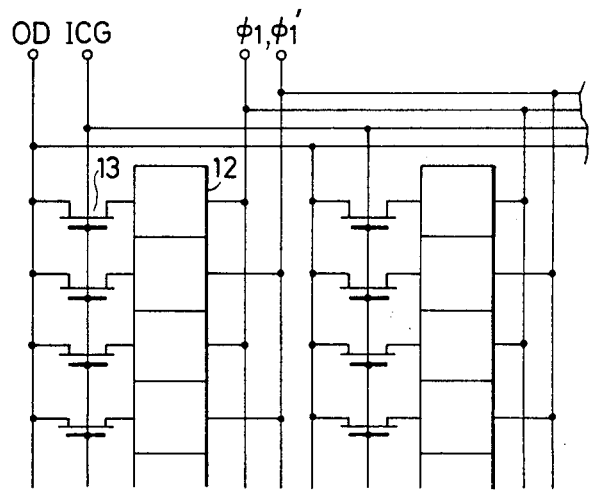
FIGS. 5A and 5B show an example of the construction of an image pick-up element.
Figure 5B:
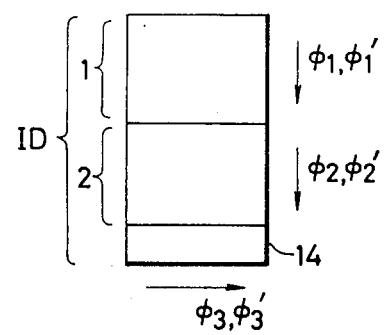

FIGS. 5A and 5B show an example of the construction of an image pick-up element used in the present embodiment, and more particularly, FIG. 5A shows the structure of the photoelectric converting portion 1 thereof, and FIG. 5B shows the construction of the entire element. $\phi_1$ and $\phi_1'$ designate clock pulses for transferring the charge of the photoelectric converting portion 1 to a storing portion 2, $\phi_2$ and $\phi_2'$ denote clock pulses for transferring the charge of the storing portion 2 to a horizontal shift register 14, and $\phi_3$ and $\phi_3'$ designate clock pulses for reading out the content of the horizontal shift register. Designated by ICG is a signal input terminal for opening a gate 13 for causing the charge of each picture element 12 to flow to a drain terminal OD, which is ordinarily connected to the power source, so that a charge in picture element 12 is supplied to the power source by opening gate 13. When a low level is applied to the input terminal ICG, a barrier of a predetermined height is formed between the input terminal ICG and the drain, and charge having passed beyond this barrier flows into the drain and is detected by a circuit which will hereinafter be described.

Figure 6:
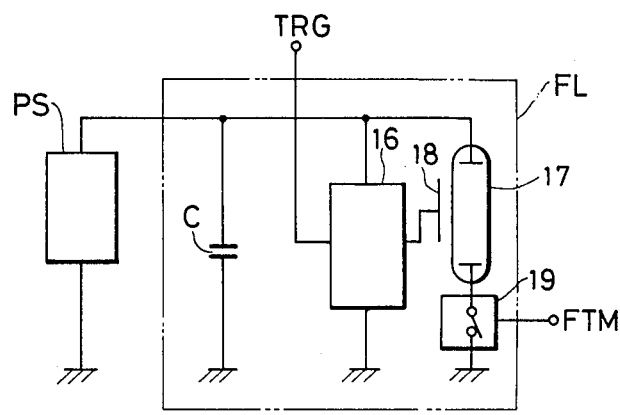
FIG. 6 shows an example of the construction of a flashlight emitting circuit.

Referring now to FIG. 6 which shows an example of the construction of a flashlight source applicable to the present embodiment, PS designates a power source, C denotes a capacitor, 16 designates a trigger circuit, TRG denotes the trigger terminal thereof, 17 denotes a flashlight discharge tube actuated by a trigger electrode 18 controlled by the trigger circuit, 19 designates a switch circuit, and FTM denotes a reset terminal for opening the switch circuit by a high level input signal.

Figure 7A:
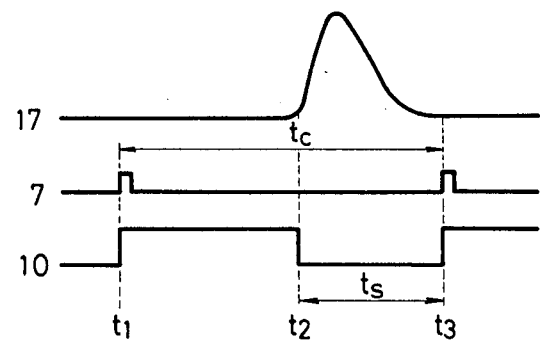
FIGS. 7A and 7B illustrate the operation of the circuit shown in FIG. 4.
Figure 7B:
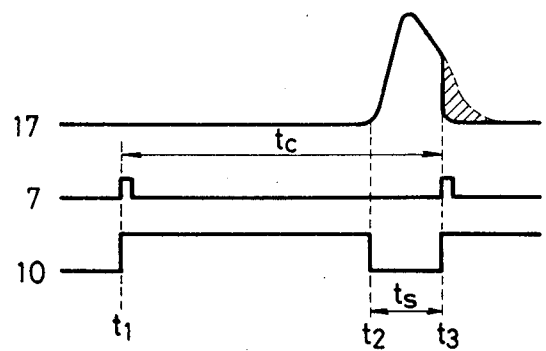

The operation of the present embodiment thus constructed will now be described by reference to FIGS. 7A and 7B. First, the synchronizing circuit 7 and oscillator 5 start operating in response to an actuating switch, not shown. The synchronizing circuit 7 puts out a pulse, for example, at a period of 1/60 sec., and one shot OS1 synchronous in rising opens the gate 6 for a predetermined time, whereby the pulse output (10 MHz) of the oscillator 5 is supplied as pulses $\phi_1$ and $\phi_2$ to the image pick-up element ID while, at the same time, pulses $\phi_1'$ and $\phi_2'$ inverted in phase with respect to the pulses $\phi_1$ and $\phi_2$ are also supplied to the element ID. Accordingly, the charges in the photoelectric converting portion 1 and the storing portion 2 are transferred to the shift register. Also, the power supply path to the discharge tube of the flashlight emitting circuit LT is cut off by the rising of the output of the synchronizing circuit 7.

In synchronism with the rising of the output of the synchronizing circuit 7, the pulse width modulating circuit operates to put out a high level signal at a duty corresponding to the value of the setting means VR. This output of the pulse width modulating circuit 10 is supplied to the terminal ICG of the image pick-up element ID and the terminal ICG makes the accumulation of charge impossible for the duration of the high level.

Thus, the time during which the terminal ICG is at low level corresponds to the charge accumulating time $t_s$.

One-shot circuit OS3 forms a pulse in synchronism with the falling of the output of the pulse width modulating circuit 10 and the trigger circuit 16 of the flashlight emitting circuit LT is operated by this pulse.

Accordingly, light emission is started in synchronism with the falling of the terminal ICG to low level, or in other words, in synchronism with the start of accumulation of the image, and light emission is stopped in synchronism with the start of transfer.

Consequently, no light is emitted during the transfer period and therefore, no irregularity of the brightness of the image is created, nor is smear created. Moreover, light emission is synchronized with the start of accumulation and thus, the light emission period can overlap the transfer period only when the accumulation time is short, and wasteful light emission is thus minimized.

Thus, the present embodiment of the invention has a great advantage in that the flashlight emitting device is reset by the output of the one-shot circuit 8 as the transfer starting signal.

In such a sense, the one-shot circuit 8 can be said to be an inhibition means.

Although, in the present embodiment, the accumulating time control is effected by the length of the high level period of the input ICG with the transfer period being constant, the accumulating time control may also be effected by changing the transfer period.

Also, in the description of the present embodiment, an example of the frame transfer type CCD has been mentioned as the image pick-up element as the image pick-up means, but alternatively, this may be an interline type CCD. Also, even if the image pick-up means used is an image pick-up tube or an MOS X-Y address type image sensor, where it is designed to temporally transfer the information in the light-receiving surface thereof to a buffer memory at a high speed, the present invention is applicable.

Figure 8:
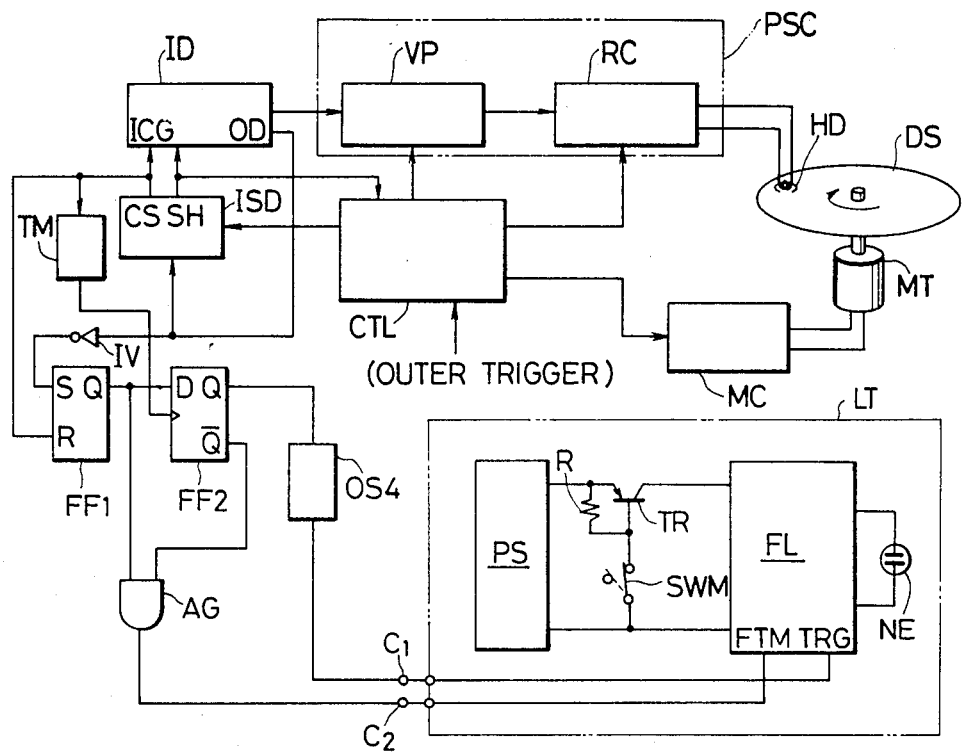
FIG. 8 is a circuit block diagram of a second embodiment of the present invention.

A second embodiment of the present invention will now be described with reference to FIG. 8. In FIG. 8, ID designates a solid state image pick-up element such as a CCD, BBD or MOS image sensor as a signal integrating type image pick-up means and here, it is an area type CCD as shown, for example, in FIG. 5A. ISD denotes an image pick-up element driving circuit for driving the image pick-up element ID by the clock pulse from a synchronizing and control circuit CTL which governs the generation and sequence control of a synchronizing signal, VP designates a well-known recording signal generating circuit which processes the image pick-up signal from the image pick-up element ID by the synchronizing signal from the synchronizing and control circuit CTL and generates a recording signal, and RC denotes a recording circuit controlled by the control signal from the synchronizing and control circuit CTL. By this recording circuit RC through a magnetic head HD, video signals may be recorded in a well-known manner on a magnetic disc DS rotatively driven by a motor MT. MC designates a motor control circuit for controlling the rotation of the disc DS rotated by the motor MT, by the synchronizing signal from the synchronizing and control circuit CTL. FF1 designates an RS-flip-flop reset on the one hand by the falling of an integration clear signal CS from the image pick-up element driving circuit ISD to the terminal ICG of the image pick-up element ID and set on the other hand by the falling of the output of an inverter IV which receives a signal form the drain terminal OD of the image pick-up element ID which exceeds a predetermined threshold, TM denotes a timer circuit which puts out a high level signal for a predetermined time by being triggered by the falling of the signal CS from the driving circuit ISD, FF2 designates a D-flip-flop adapted to receive the Q output of the flip-flop FF1 at its D input on the one hand and to be triggered by the falling of the output of the timer circuit TM on the other hand, OS4 denotes a one-shot circuit (a monostable multivibrator) which puts out a single pulse in response to the falling of the Q output of the flip-flop FF2, and AG designates an AND gate which receives the Q output of the flip-flop FF1 and the $\overline{Q}$ output of the flip-flop FF2.

SWM designates a manually operable main switch, TR denotes a pnp switching transistor adapted to be turned on by closing of the switch SWM, R designates a protective resistor for the transistor TR, FL denotes a flash output control type flashlight unit adapted to make the preparation for light emission (the photocharging of a main capacitor, etc.) by being supplied with power from a power source circuit PS upon conduction of the transistor TR, and NE designates a neon lamp for displaying the completion of charging of a main capacitor for accumulating therein the light energy emitted by the flashlight unit.

The output of the one-shot circuit OS4 is adapted to be imparted as a light emission trigger signal to the light emission trigger terminal TRG of the flashlight unit through a connector C1 between the camera and the flashlight unit, and the output of the AND gate AG is adapted to be imparted to a reset terminal FTM through a connector C2. A well-known safety gate is provided so that a light emission stop command signal can be input to the reset terminal FTM only when light emission is actually effected.

Now, in such a construction, when the signal CS from the image pick-up element driving circuit ISD is high, the drain gate ICG of the image pick-up element ID is open and therefore, the accumulation of signals is inhibited. When the signal CS then becomes low, the drain gate ICG is closed and signal integration is started in the image pick-up element ID, while the flip-flop FF1 is reset by the then falling of the signal CS and the timer circuit TM is triggered.

The operation thereafter is divided into two depending on whether a high signal representative of the fact that the image pick-up signal has reached a predetermined proper level is obtained from the drain OD of the image pick-up element ID before the lapse of the time predetermined by the timer circuit TM.

In the ensuing description, it is to be understood that the system is in a condition in which the preparation for light emission has been completed so that the flashlight unit FL can effect light emission at any time.

When a high signal has been obtained from the drain OD before the lapse of the time predetermined by the timer circuit TM, the output of the inverter IV falls from high to low, whereby the flip-flop FF1 is set and the Q output thereof becomes high, whereafter the flip-flop FF2 is triggered by the falling of the output of the timer circuit TM and therefore, the Q output and $\overline{Q}$ output thereof become high and low, respectively. Thereafter, as far as the flip-flop FF1 is set before the lapse of the time predetermined by the timer circuit TM, the Q output and $\overline{Q}$ output of the flip-flop FF2 are kept high and low, respectively, and accordingly, the light emission of the flashlight unit FL is not effected.

The image pick-up element driving circuit ISD puts out a read-out starting pulse SH to the image pick-up element ID in response to the signal from the drain OD of the image pick-up element ID, thereby starting read-out of the image pick-up signal. The then read-out starting pulse SH is imparted also to the synchronizing and control circuit CTL.

Next, when the time predetermined by the timer circuit TM has elapsed before a high signal is obtained from the drain OD of the image pick-up element ID, the flip-flop FF2 is triggered before the flip-flop FF1 is set and the Q output thereof becomes high and therefore, the Q output and $\overline{Q}$ output of the flip-flop FF2 become low and high, respectively. In response to the resultant falling of the Q output from high to low, a pulse is put out from the one-shot circuit OS4 and this is imparted to the light emission trigger terminal TRG of the flashlight unit FL through the connector C1 and thus, light emission of the flashlight unit FL is effected. By the resulting light emission of the flashlight unit FL, the signal level in the image pick-up element ID reaches a proper level and a high signal is put out from the drain OD, whereby the flip-flop FF1 is set and the Q output thereof becomes high and accordingly, the output of the AND gate AG becomes high. The high output of the AND gate AG is imparted to the reset terminal FTM of the flashlight unit FL through the connector C2 and thus, the light emission is stopped.

Of course, read-out of the image pick-up signal from the image pick-up element ID is immediately started by the driving circuit ISD in response to the high signal from the drain OD.

As described above in detail, the present embodiment, as a camera using a signal integrating type image pick-up means as the image pick-up means, can always ensure photography with the proper brightness level, particularly irrespective of the limitation on the longer time side of the signal integrating time of the image pick-up means and enables failure-free photography and thus, it is very useful in cameras of this type.

Figure 9:
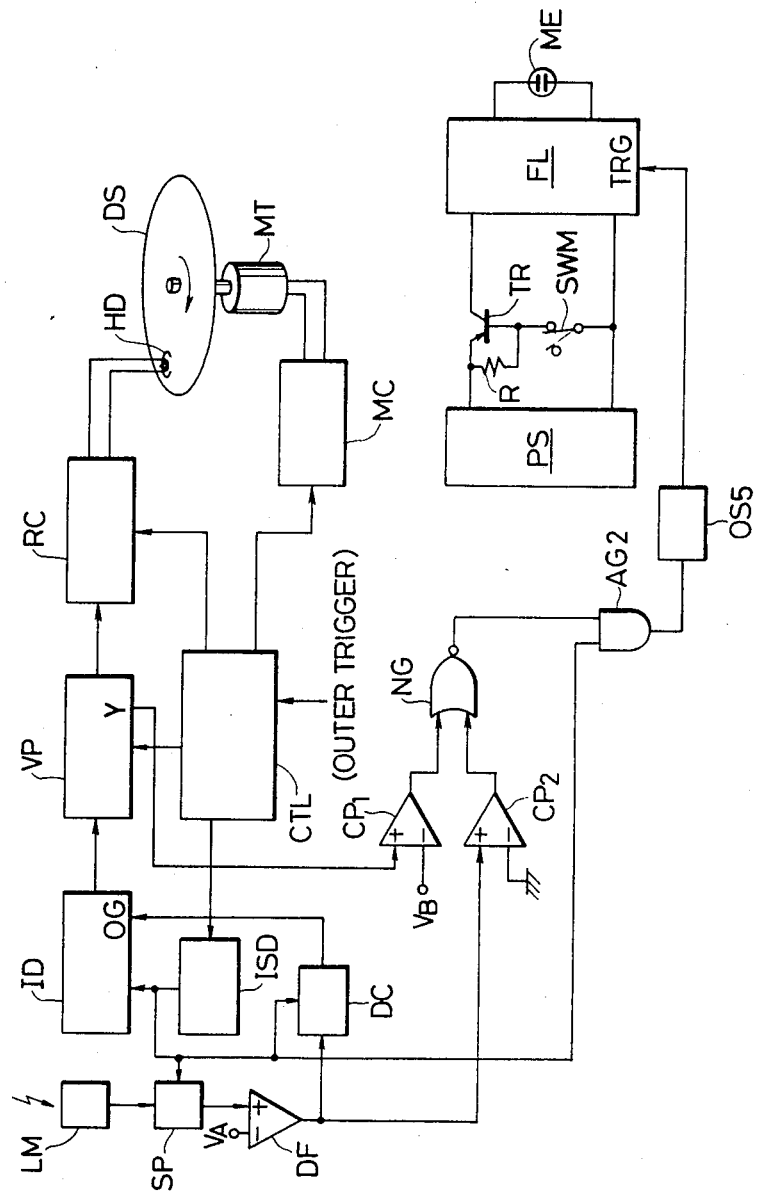
FIG. 9 is a block diagram of a third embodiment of the present invention.

FIG. 9 shows the construction of a third embodiment of the present invention. In FIG. 9, reference characters similar to those in FIG. 8 designate similar elements.

In this embodiment, it is to be understood that read-out of image pick-up signal is repetitively effected at intervals of 1/60 sec. and accordingly, the signal integrating time of the image pick-up element ID is controlled with 1/60 sec. at the longest as the limit.

LM designates a well-known light-metering circuit which meters a light substantially equivalent to the light received by the image pick-up element ID and puts out a voltage signal corresponding to the metered value, SP denotes a sampling circuit which samples the output voltage of the light-metering circuit LM in response to the read-out starting pulse (i.e., pulse at each 1/60 sec.) from the image pick-up element driving circuit ISD, DF designates a differential amplifier for subtracting from the output of the sampling circuit SP a predetermined voltage level $V_A$ of the image pick-up element ID corresponding to the signal integrating time of 1/60 sec., and DC denotes a duty ratio control circuit which may be triggered by the read-out starting pulse from the image pick-up element driving circuit ISD to thereby form a high pulse of a duration width (the limit of which is a value less than 1/60 sec.) corresponding to the level of the positive output of the differential amplifier DF (the negative output of which is neglected) from the point of time at which the duty ratio control circuit is triggered. The output of the duty ratio control circuit DC is imparted to the drain gate terminal ICS of the image pick-up element ID and, for the period during which this output is high, the drain gate 13 remains open and in the meantime, the signal (charge) produced in the image pick-up portion is not accumulated but discharged to the drain OD through the gate 13 and thus, the signal integrating time of the image pick-up element ID is controlled as (1/60 sec.)−(the ON period of the gate 13=the period during which the output of the duty ratio control circuit DC is high).

CP1 designates a comparator which compares a brightness signal Y generated by a recording signal generating circuit VP with a reference level $V_B$ providing the basis for ensuring a recording signal of a predetermined level and puts out a low signal when the level of the brightness signal Y is below the reference level $V_B$, or in other words, when the level of the image pick-up signal from the image pick-up element ID is so low that it cannot ensure the recording signal of said predetermined level, CP2 denotes a comparator which puts out a low signal when the output of the differential amplifier DF becomes negative, NG designates a NOR gate which puts out a high signal when the outputs of the two comparators CP1 and CP2 are both low, AG2 denotes an AND gate which receives the output of the NOR gate NG and the read-out starting pulse from the image pick-up element driving circuit ISD, and OS5 designates a one-shot circuit which generates a single pulse in response to the falling of the output of the AND gate AG2. The flashlight unit FL should preferably be an automatic flash output control type strobo. The output of the one-shot circuit OS5 is imparted to the trigger terminal TRG of the flashlight unit FL.

In such a construction, assuming that the output of the differential amplifier DF has become negative, the output of the duty ratio control circuit DC remains low and does not become high because the duty ratio control circuit DC is adapted to respond only to a positive input at such time, as described above, and accordingly, the gate 13 of the image pick-up element ID remains closed and the signal integrating time of the image pick-up element ID is the longest, i.e., 1/60 sec. That is, the low level of the output of the comparator CP2 means that the signal integrating time of the image pick-up element ID is controlled to the longest, i.e., 1/60 sec. On the other hand, as described above, the low level of the output of the comparator means that the level of the image pick-up signal is insufficient and thus, after all, the high of the output of the NOR gate NG means that the brightness of the object has lowered to such a degree that cannot ensure proper image recording and, in such a case, at a point of time whereat the read-out starting pulse is put out from the image pick-up element driving circuit ISD, the output of the AND gate AG2 becomes high and upon the falling thereof, a pulse is put out from the one-shot circuit OS5, whereby the flashlight unit FL is triggered in synchronism with the initiation of the accumulation of the next image pick-up signal and effects light emission.

Thus, in the present embodiment, when such a situation occurs that in order to obtain an image pick-up signal of a proper level with 1/60 sec. as the longest signal integrating time, a longer signal integrating time is required, the light emission of the flashlight unit is automatically effected in conformity to the accumulation of the next image pick-up signal.

Another embodiment of the present invention will now be described with reference to FIG. 10. This embodiment is designed such that the limit on the longer time side of the signal integrating time of the image pick-up element ID is eliminated and the signal integrating time can theoretically be made as long as desired, while the flashlight unit can be automatically operated when the signal integrating time exceeds a predetermined time.

Figure 10:
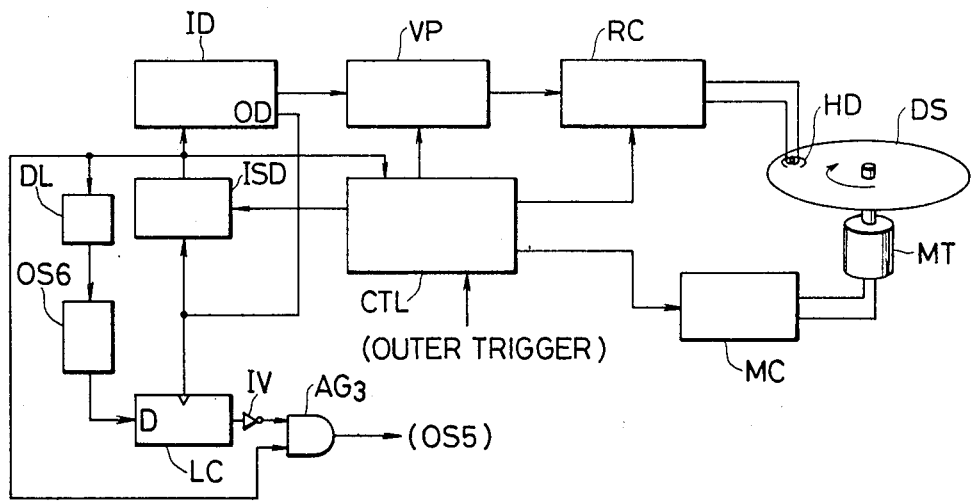
FIG. 10 is a block diagram of a fourth embodiment of the present invention.

In FIG. 10, reference characters similar to those in FIG. 9 designate elements similar to those already described. In the Figure, the image pick-up element ID is designed such that it can put out a high signal from its terminal OD when the integrated signal in any picture element thereof has reached a predetermined amount (specifically, for example, such a value as can ensure an image pick-up signal of a proper level as the entire picture element). Specifically, the construction of FIG. 5A or a construction with a well-known overflow drain may be employed as such a construction. The image pick-up element driving circuit ISD is adapted to effect read-out of the image pick-up signal from the image pick-up element ID in response to the high output from the terminal OD of the image pick-up element ID. Also, from the requirement that recording of image pick-up signal be effected in conformity to the readout of the image pick-up signal from the image pick-up element ID, the read-out starting pulse from the driving circuit ISD is adapted to be imparted to the synchronizing and control circuit CTL. DL designates a delay circuit for delaying the read-out starting pulse from the driving circuit ISD by a predetermined minute time, OS6 denotes a one-shot circuit (a monostable multivibrator) which puts out a high level signal having a predetermined duration by being triggered by the output of the delay circuit DL, LC designates a D-latch circuit adapted to receive the output of the one-shot circuit OS6 at the D input thereof and to be triggered by the signal from the terminal OD of the image pick-up element ID, and IV denotes an inverter for inverting the output of the latch circuit LC. The output of the inverter IV, with the read-out starting pulse from the driving circuit ISD, is imparted to an AND gate AG3 similar to the one described above.

In such a construction, when the read-out starting pulse is put out from the image pick-up element driving circuit ISD and the read-out of the image pick-up signal from the image pick-up element ID is started, accumulation of the next image pick-up signal is started in the image pick-up portion simultaneously therewith and, at this time, the one-shot circuit OS6 is triggered after the minute delay time predetermined by the delay circuit DL from the point of time whereat the read-out starting pulse has been generated, and effects a high level output for a predetermined time. If a high signal is put out from the terminal OD of the image pick-up element ID and the read-out of the image pick-up signal is started during the time the output of the one-shot circuit OS6 is high, the high signal is latched by the latch circuit LC at this time and the output of the inverter IV becomes low, but if a high signal is not put out from the terminal OD of the image pick-up element ID during the time the output of the one-shot circuit OS6 is high but a high signal is put out from the terminal OD after the output of the one-shot circuit OS6 has changed to low, a low signal is put out in the latch circuit LC and therefore, the output of the inverter IV becomes high. That is, in the present embodiment, the output of the inverter IV becomes high when the signal integrating time of the image pick-up element ID exceeds a predetermined time comprising the delay time by the delay circuit DL plus the period during which the output of the one-shot circuit OS6 is high. Accordingly, by the output of the one-shot circuit OS5 generated upon falling of the output of the AND gate AG3 which receives the output of the inverter IV being imparted to the trigger terminal TRG of the flashlight unit FL, the flashlight unit FL can immediately be caused to emit light in the case of the accumulation of the next image pick-up signal when the signal integrating time of the image pick-up element ID exceeds said predetermined time.

A fourth embodiment of the present invention will now be described with reference to FIG. 11. This embodiment somewhat differs from the embodiment of FIG. 10 in that in the FIG. 10 embodiment, control of the signal integrating time is effected in real time, whereas in the present embodiment, control of the signal integrating time is effected in non-real time.

Figure 11:
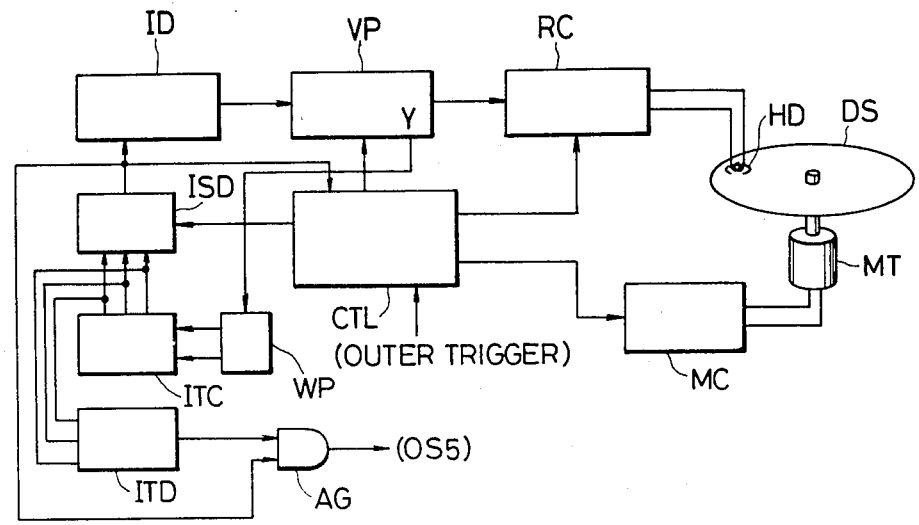
FIG. 11 is a block diagram of a fifth embodiment of the present invention.

In FIG. 11, reference characters similar to those in FIGS. 9 and 10 designate elements similar to those already described. WP designates a window comparator which compares the level of the brightness signal Y from the recording signal generating circuit VP with a predetermined voltage range (having an upper limit and a lower limit), and ITC denotes a signal integrating time setting circuit which, on the basis of the output of the window comparator WP, makes the signal accumulating time invariable when the level of the brightness signal Y is within said predetermined voltage range, sets a shorter time as the signal integrating time when the level of the brightness signal Y is above the upper limit of said predetermined voltage range, and sets a longer time as the signal integrating time when the level of the brightness signal Y is below the lower limit of said predetermined voltage range. The driving circuit ISD functions to control the signal integrating time of the image pick-up element ID under the time set by the setting circuit ITC. ITD designates a time discriminating circuit which discriminates whether the signal integrating time set by the setting circuit ITC is longer than a predetermined time and puts out a high signal when it is longer. The AND gate AG3 receives the output of this discriminating circuit ITD and the read-out starting pulse from the image pick-up element driving circuit ISD, and the output thereof is imparted to the one-shot circuit OS5.

Thus, when it is judged by the discriminating circuit ITD that the signal integrating time of the image pick-up element ID is longer than the predetermined time, a high pulse is put out from the one-shot circuit OS5 in conformity to the accumulation of the next image pick-up signal as in the case of the FIG. 9 embodiment, whereby the flashlight unit FL is trigged to effect light emission.

In the case of the embodiments shown in FIGS. 9 and 10, the flashlight unit used should preferably be of the automatic flash output control type and accordingly, it is necessary to anticipate flashlight photography and adjust the photographic diaphragm in the picture-taking optical system in accordance with the designated aperture value thereof.

In contrast, in the case of the embodiment shown in FIG. 10, control of the signal integrating time is effected in real time under the light emitted by the flashlight unit FL and therefore, the flashlight unit need not always be of the automatic flash output control type and, even if it is of the flash output control type, particularly the designated aperture value need not be taken into account.

According to such embodiments of the present invention as a camera using a signal integrating type image pick-up means as the image pick-up means, photography by a proper brightness level can always be ensured irrespective of the limitation on the longer time side of the signal integrating time of the image pick-up means and failure-free photography becomes possible, and this is very useful in cameras of this type.

Figure 12:
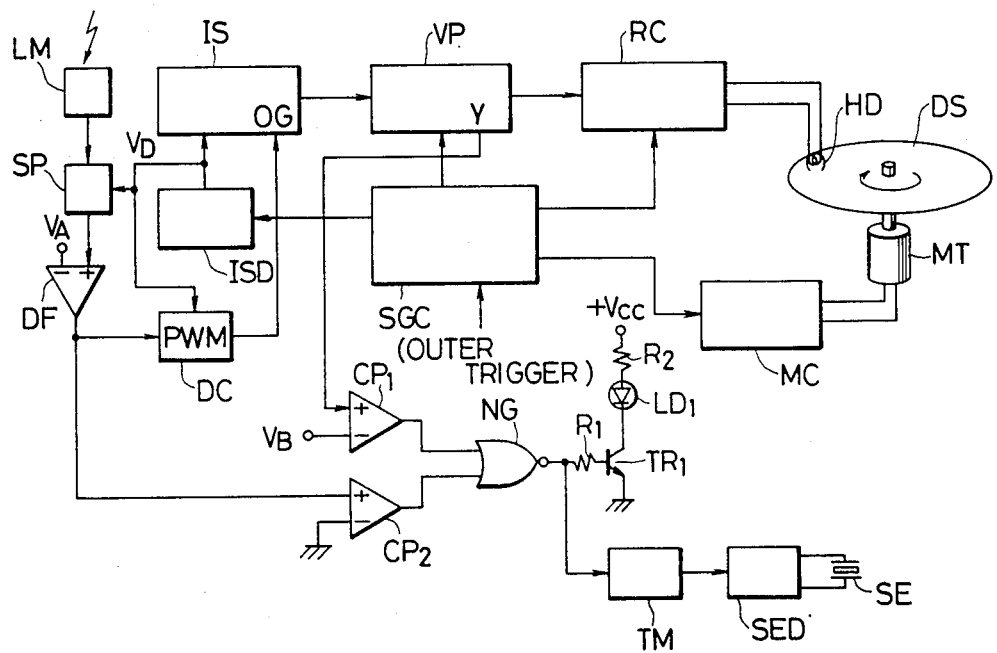
FIG. 12 is a block diagram of a sixth embodiment of the present invention.

Referring now to FIG. 12, it shows the construction of a sixth embodiment of the present invention. In FIG. 12, reference characters similar to those in FIGS. 1–11 designate similar elements. This embodiment is basically similar to the third embodiment shown in FIG. 9. TR1 designates an npn switching transistor which responds to the output of the NOR gate NG, LD1 denotes a light-emitting element for display connected to the collector of the transistor TR1, TM designates a timer circuit which puts out a high signal for a predetermined time (for example, several seconds) in response to the high output of the NOR gate NG, and SED denotes a sound-emitting element driving circuit (for example, an oscillating circuit) which drives a sound-emitting element SE for the period of the high output of the timer circuit TM. R1 and R2 designate protective resistors.

Assuming that the output of the differential amplifier DF has become negative, the output of the duty ratio control circuit DC remains low and does not become high because the duty ratio control circuit DC is adapted to respond only to a positive input, as described above, and accordingly, the drain gate 13 of the image pick-up element ID remains closed and the signal integrating time of the image pick-up element ID becomes maximum i.e., 1/60 sec. That is, the low of the output of the comparator CP2 means that the signal integrating time of the image pick-up element ID is controlled to the longest value, i.e., 1/60 sec. On the other hand, as described above, the low level of the output of the comparator CP1 means that the level of the image pick-up signal is insufficient and therefore, after all, the high of the output of the NOR gate NG means that the brightness of the object has lowered to such a degree that proper image recording cannot be ensured and, in such a case, the light-emitting element LD1 emits light and also the sound-emitting element SE emits a sound for several seconds, whereby a warning for urging photography by the flashlight unit is effected.

Thus, in the present embodiment, when such a situation occurs that in order to obtain an image pick-up signal of a proper level with 1/60 sec. as the longest signal integrating time, a longer signal integrating time is required, a warning for urging the change-over to a smaller aperture value is effected by the light-emitting element LD1 and the sound-emitting element SE. In this case, the sound display may also be one using a sound ROM.

Figure 13:
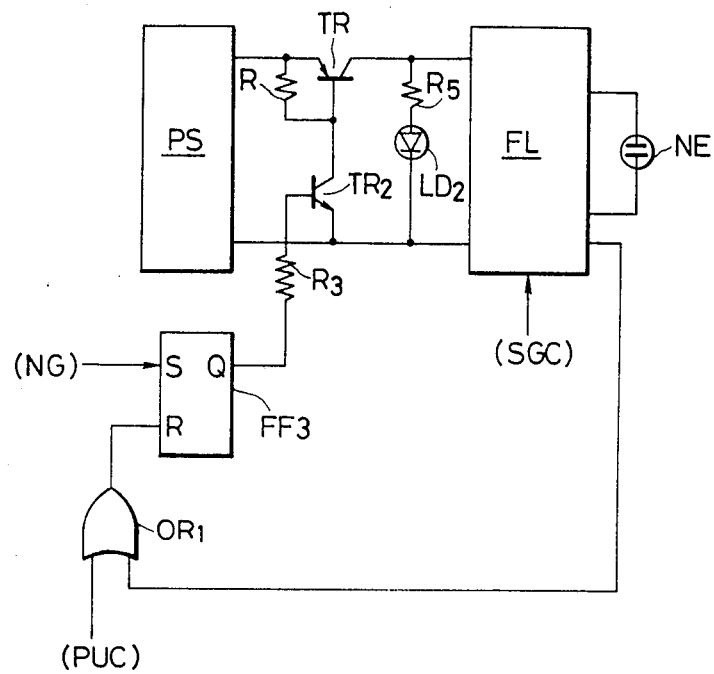
FIG. 13 is a block diagram of a seventh embodiment of the present invention.

Now, in the above-described embodiment, display has been limited to the warning display for urging the photography by the flashlight unit or the change-over of the diaphragm, but further, for example, in the case of a camera containing a flashlight unit therein, design may be made such that the camera is automatically set to the flashlight photography mode or the flashlight unit is rendered into a preparatory condition as by automatically starting the charging of the flashlight unit. Such a seventh embodiment will now be described with reference to FIG. 13. In FIG. 13, TR2 designates an npn switching transistor, LD2 denotes a light-emitting element for display adapted to be turned on by being supplied with power from a power source circuit PS by conduction of the transistor TR2, and FF3 designates an RS-flip-flop adapted, on the one hand, to be reset by a triggering power-up clear signal (PUC) for starting to drive the image pick-up element through an OR gate OR1 or a light emission completion signal from the flashlight unit FL and, on the other hand, to be set by a high signal from the NOR gate NG of FIG. 12. The transistor TR2 is connected so as to be turned on by the high of the Q output of the flip-flop FF3. R3, R and R5 denote protective resistors.

According to that construction, when the output of the NOR gate NG becomes high as described above, the flip-flop FF3 is set thereby and the Q output thereof becomes high, whereby the transistor TR2 and accordingly the transistor TR are turned on and the supply of power to the flashlight unit FL is started and thus, the camera is automatically set to the mode of photography using the flashlight unit. In this case, the light-emitting element LD2 emits light, thereby displaying that the camera has been automatically set to the photography mode using the flashlight unit. When the charging of the main capacitor in the flashlight unit FL is then completed, the neon lamp NE is turned on. For example, design may also be made such that by the then charging completion signal, the diaphragm aperture of a diaphragm device, not shown, is automatically adjusted to the designated aperture value of the flashlight unit or in another type of device, a distance-aperture interlocking mechanism is automatically operated. Also, as regards the triggering of the flashlight unit FL with the charging thereof completed, it is necessary to apply the triggering so that, for example, in response to a command by a release, not shown, light emission is effected through the synchronizing and control circuit CTL within the signal accumulating period in the image pick-up element ID. When the light emission of the flashlight unit FL is completed, the flip-flop FF3 is reset and the transistors TR2 and TR are turned off, whereby the supply of power to the flashlight unit FL is cut off.

Figure 14:
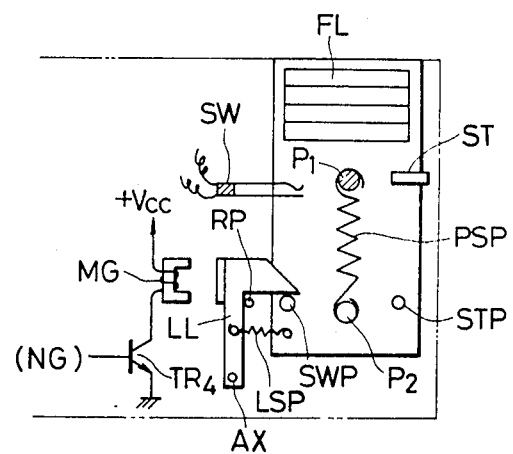
FIG. 14 is a model view showing the construction of an eighth embodiment of the present invention.

In a camera containing a pop-up type flashlight unit therein as in an eighth embodiment shown, for example, in FIG. 14, the high output of the NOR gate NG may be utilized to automatically pop up the flashlight unit and thereby automatically set the camera to the flashlight photography mode. In FIG. 14, the flashlight unit FL is held at a position in which it has been forced into the camera against a pop-up spring PSP extended between a pin P1 on the camera body side and a pin P2 on the unit FL side, by a latch lever LL being engaged with a switch pin SWP under the action of a latch spring LSP. AX designates the pivot shaft of the latch lever LL, RP denotes a pivotal movement controlling pin, TR4 designates an npn switching transistor adapted to be turned on by the high output of the NOR gate NG of FIG. 12, and MG denotes a magnet supplied with power by conduction of the transistor TR4. That is, when power is supplied to the magnet MG by the high of the output of the NOR gate NG, the latch lever LL is pivoted counter-clockwise about the shaft AX against the force of the spring LSP and releases the latch of the switch pin SWP. Thereby, the flashlight unit FL pops up until the stop pin STP thereof abuts against a stop ST on the camera body side under the action of the spring PSP and is controlled thereby, and in this position, the switch pin SWP closes a switch SW. The switch SW may be used, for example, instead of the transistor TR2 of FIG. 13, whereby the supply of power to the flashlight unit FL may be started by closing of the switch SW, as described above.

A ninth embodiment of the present invention will now be described with reference to FIG. 15. In this embodiment, the limit on the longer time side of the signal integrating time of the image pick-up element ID is eliminated and the signal integrating time can theoretically be made as long as desired while, on the other hand, the warning for urging photography using the flashlight unit or the automatic setting to the flashlight photography mode is effected when the signal integrating time exceeds a predetermined time.

Figure 15:
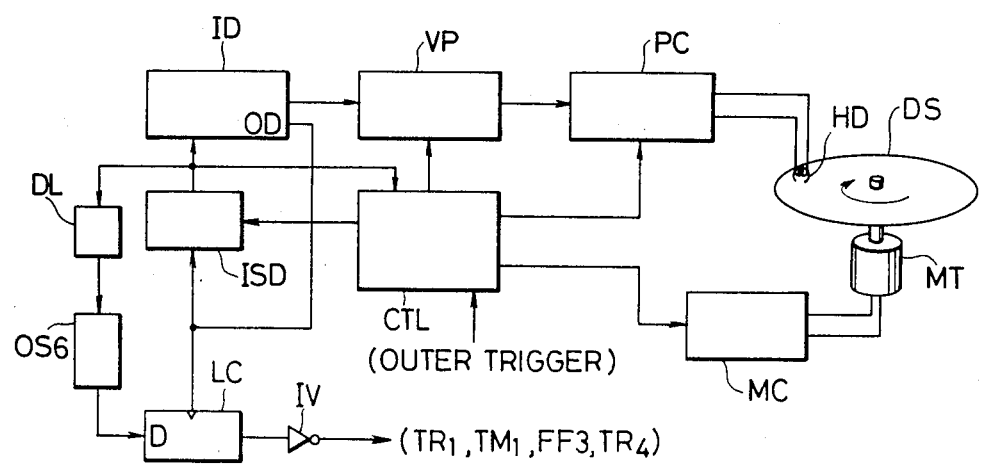
FIG. 15 is a block diagram of a ninth embodiment of the present invention.

In FIG. 15, reference characters similar to those in FIGS. 1 to 14 designate elements similar to those already described. The construction shown in FIG. 15 is basically similar to the construction shown in FIG. 10. In FIG. 15, the output of the inverter IV may be imparted to the base of the transistor TR1 of FIG. 12 and the timer circuit TM, or the set input S of the flip-flop FF3 of FIG. 13, or the base of the transistor TR4 of FIG. 14, whereby an effect similar to that of the above-described embodiments can be obtained.

Finally, a tenth embodiment of the present invention will be described with reference to FIG. 16. This embodiment differs more or less from the embodiment of FIG. 15 in that in the embodiment of FIG. 15, control of the signal integrating time is effected in real time, whereas in this embodiment, control of the signal integrating time is effected in non-real time. The present embodiment employs a construction basically similar to the construction of FIG. 11.

Figure 16:
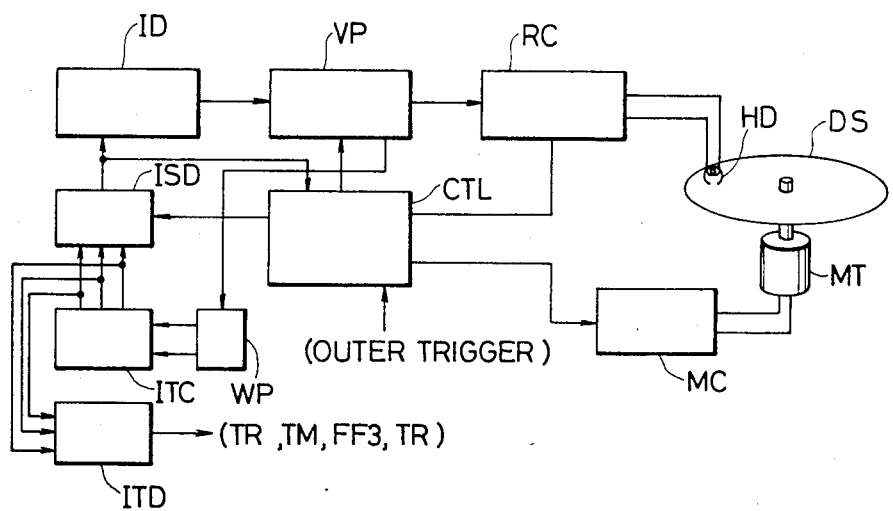
FIG. 16 is a block diagram of a tenth embodiment of the present invention.

In FIG. 16, elements given reference characters similar to those in FIGS. 1 to 15 are similar to those already described.

In the present embodiment, the output of the time discriminating circuit ITD can be used similarly to the output of the NOR gate NG of FIG. 11 or the output of the inverter IV of FIG. 15.

As described above in detail, according to the embodiments of the present invention, as a camera using a signal integrating type image pick-up means as the image pick-up means, photography by a proper brightness level can always be ensured irrespective of the limitation on the longer time side of the signal integrating time of the image pick-up means and failure-free photography becomes possible, and this is very useful in cameras of this type.

What is claimed is:

1. An image pick-up device for use with illuminating means for illuminating an object to be photographed, said device comprising:
    (a) photoelectric converting means for converting the image of the object into electrical image information;
    (b) memory means for storing therein the electrical image information formed in said photoelectric converting means; and
    (c) inhibiting means for inhibiting the illuminating operation of the illuminating means during at least the time the electrical image information formed in said photoelectric converting means is transferred to said memory means.

2. An image pick-up device according to claim 1, wherein the illuminating means includes a flashlight source.

3. An image pick-up device according to claim 1, wherein said photoelectric converting means is the light-receiving portion of a semiconductor image sensor and said memory means is the light-intercepted memory portion of said image sensor.

4. An image pick-up device according to claim 1, wherein the electrical image information formed in said photoelectric converting means is transferred to said memory means within the vertical blanking period of a standard television signal.

5. An image pick-up device for use with illuminating means for illuminating an object to be photographed, said device comprising:
    (a) photoelectric converting means for converting the image of the object into electrical image information;
    (b) clear means for clearing the electrical image information in said photoelectric converting means; and
    (c) means for initiating the illumination by the illuminating means after the termination of the clearing operation of said clear means, said initiating means inhibiting the illumination while said photoelectric converting means moves the electrical image information.

6. An image pick-up device according to claim 5, wherein said clear means includes a gate for directing to a drain the electrical image information formed in said photoelectric converting means.

7. An image pick-up device according to claim 6, wherein the clearing operation time of said clear means is variable.

8. An image pick-up device according to claim 5, further comprising memory means for storing therein the electrical image information in said photoelectric converting means and wherein said clear means clears said photoelectric converting means by directing the electrical image information in said photoelectric converting means to said memory means.

9. An image pick-up device according to claim 5, wherein the illuminating means includes a flashlight source.

10. An image pick-up device for use with illuminating means for illuminating an object to be photographed, said device comprising:
    (a) photoelectric converting means for converting the image of the object into electrical image information;
    (b) clear means for clearing the electrical image information in said photoelectric converting means; and
    (c) illumination controlling means for effecting the illumination by the illuminating means after the clearing operation by said clear means and thereafter stopping the illuminating operation by the illuminating means in accordance with the level of the electrical image information formed by said photoelectric converting means, said illumination controlling means inhibiting the illumination while said photoelectric converting means moves the electrical information.

11. An image pick-up device according to claim 10, wherein said clear means includes a gate for directing the electrical image information in said photoelectric converting means to a drain.

12. An image pick-up device according to claim 10, further comprising memory means for storing therein the electrical image information in said photoelectric converting means and wherein said clear means clears said photoelectric converting means by directing the electrical image information in said photoelectric converting means to said memory means.

13. An image pick-up device according to claim 10, wherein the illuminating means includes a flashlight source.

14. An image pick-up device according to claim 10, wherein said illumination controlling means includes detecting means for detecting the level of the electrical image information formed in said photoelectric converting means.

15. An image pick-up device according to claim 14, wherein said detecting means includes an overflow drain for detecting the overflow of the electrical image information in at least a portion of said photoelectric converting means.

16. An image pick-up device for use with illuminating means for illuminating an object to be photographed, said device comprising:
    (a) photoelectric converting means for converting the image of the object into electrical image information;

(b) clear means for clearing the electrical image information in said photoelectric converting means;

(c) detecting means for detecting the level of the electrical image information in said photoelectric converting means; and (d) illumination controlling means for bringing the illuminating means into a preparatory condition for illuminating or a non-preparatory condition in accordance with the output condition of said detecting means.

17. An image pick-up device according to claim 16, wherein the illuminating means includes a flashlight source.

18. An image pick-up device according to claim 17, wherein the illuminating means has a charging power source for causing a flashlight source to emit light.

19. An image pick-up device according to claim 18, wherein said illumination controlling means opens and closes a charging circuit to said charging power source, thereby bringing the illuminating means into a non-preparatory condition and a preparatory condition for illuminating respectively.

20. An image pick-up device according to claim 16, wherein said clear means includes a gate for directing to a drain the electrical image information formed in said photoelectric converting means.

21. An image pick-up device according to claim 16, further comprising memory means for storing therein the electrical image information in said photoelectric converting means and wherein said clear means clears said photoelectric converting means by directing the electrical image information in said photoelectric converting means to said memory means.

22. An image pick-up device according to claim 16, wherein said detecting means changes its output condition depending on whether the level of the electrical image information in said photoelectric converting means exceeds a predetermined level.

23. An image pick-up device according to claim 22, wherein said detecting means includes an overflow drain for detecting the overflow of the electrical image information in at least a portion of said photoelectric converting means.

24. An image pick-up device according to claim 16, wherein said illumination controlling means brings the illuminating means into a preparatory condition when the output of said detecting means does not exceed a predetermined level at a point of time whereat a predetermined time has elapsed after the clearing operation by said clear means, and brings said illuminating means into a non-preparatory condition for illuminating when the output of said detecting means exceeds said predetermined level.

25. An image pick-up device according to claim 16, wherein said illuminating means includes displacing means for changing the position of a light source for bringing said illuminating means into a preparatory condition or a non-preparatory condition.

26. An image pick-up device according to claim 25, wherein said illumination controlling means changes the position of the light source to a position for illumination by said displacing means to thereby bring said illuminating means into a preparatory condition.

27. An image pick-up device for use with illuminating means for illuminating an object to be photographed, said device comprising:

(a) photoelectric converting means for converting the image of the object into electrical image information;

(b) clear means for clearing the electrical image information in said photoelectric converting means;

(c) detecting means for detecting the level of the electrical image information in said photoelectric converting means; and (d) illumination controlling means for effecting the illumination by the illuminating means when the level of the electrical image information in said photoelectric converting means is less than a predetermined level at a point of time whereat a predetermined time has elapsed after the clearing operation of said clear means.

28. An image pick-up device according to claim 27, wherein the illuminating means includes a flashlight source.

29. An image pick-up device according to claim 27, wherein said clear means includes a gate for directing to a drain the electrical image information formed in said photoelectric converting means.

30. An image pick-up device according to claim 27, further comprising memory means for storing therein the electrical image information in said photoelectric converting means and wherein said clear means clears said photoelectric converting means by directing the electrical image information in said photoelectric converting means to said memory means.

31. An image pick-up device according to claim 27, wherein said illumination controlling means includes means for stopping the illumination by the illuminating means when the level of the electrical image information in said photoelectric converting means exceeds a predetermined level after the illumination has been started.

32. An image pick-up device for use with illuminating means for illuminating an object to be photographed, said device comprising:

(a) photoelectric converting means for converting the image of the object into electrical image information;

(b) clear means for periodically clearing the electrical image information in said photoelectric converting means;

(c) detecting means for detecting the level of the electrical image information in said photoelectric converting means; and (d) illumination controlling means for effecting the illumination by the illuminating means substantially in synchronism with the termination of the clearing operation of said clear means when the level of the electrical image information in said photoelectric converting means is less than a predetermined level at a point of time whereat a predetermined time has elapsed after the periodical clearing operation of said clear means.

33. An image pick-up device according to claim 32, wherein the illuminating means includes a flashlight source.

34. An image pick-up device according to claim 32, wherein said clear means includes a gate for directing to a drain the electrical image information formed in said photoelectric converting means.

35. An image pick-up device according to claim 32, further comprising memory means for storing therein the electrical image information in said photoelectric converting means and wherein said clear means clears said photoelectric converting means by directing the electrical image information in said photoelectric converting means to said memory means.

36. An image pick-up device for use with illuminating means for illuminating an object to be photographed, said device comprising:
(a) photoelectric converting means for converting the image of the object into electrical image information;
(b) clear means for clearing the electrical image information in said photoelectric converting means;
(c) detecting means for detecting the level of the electrical image information in said photoelectric converting means; and
(d) display means for displaying the output condition of said detecting means at a point of time whereat a predetermined time has elapsed after the clearing operation of said clear means.

37. An image pick-up device according to claim 36, wherein the illuminating means includes a flashlight source.

38. An image pick-up device according to claim 36, wherein said clear means includes a gate for directing to a drain the electrical image information formed in said photoelectric converting means.

39. An image pick-up device according to claim 36, further comprising memory means for storing therein the electrical image information in said photoelectric converting means and wherein said clear means clears said photoelectric converting means by directing the electrical image information in said photoelectric converting means to said memory means.

40. An image pick-up device according to claim 36, wherein said detecting means changes its output condition depending on whether the level of the electrical image information in said photoelectric converting means exceeds a predetermined level.

41. An image pick-up device according to claim 36, wherein said display means includes a timer for effecting display continuously for a predetermined time.

42. An image pick-up device according to claim 36, wherein said display means effects display by light or sound.

43. An image pick-up device for use with illuminating means for illuminating an object to be photographed, said device comprising:
(a) photoelectric converting means for converting the image of the object into electrical image information;
(b) read-out means for periodically reading out the electrical image information in said photoelectric converting means;
(c) comparison means for comparing the electrical image information read out by said read-out means with a predetermined level; and
(d) illumination controlling means for bringing the illuminating means into a preparatory condition for illuminating or a non-preparatory condition in response to a signal indicative of whether said electrical image information is lower than a predetermined level being put out by said comparison means.

44. An image pick-up device according to claim 43, wherein the illuminating means includes a flashlight source.

45. An image pick-up device according to claim 44, wherein the illuminating means has a charging power source for causing the flashlight source to emit light.

46. An image pick-up device according to claim 45, wherein said illumination controlling means opens and closes the charging circuit to said charging power source, thereby bringing the illuminating means into a non-preparatory condition for illuminating and a preparatory condition, respectively.

47. An image pick-up device according to claim 45, wherein said illuminating means includes displacing means for changing the position of a light source for bringing said illuminating means into a preparatory conditon or a non-preparatory condition.

48. An image pick-up device according to claim 47, wherein said illumination controlling means changes the position of the light source to a position for illumination by said displacing means to thereby bring said illuminating means into a preparatory condition.

49. An image pick-up device for use with illuminating means for illuminating an object to be photographed, said device comprising:
(a) photoelectric converting means for converting the image of the object into electrical image information;
(b) read-out means for periodically reading out the electrical image information in said photoelectric converting means;
(c) comparison means for comparing the electrical image information read out by said read-out means with a predetermined level; and
(d) display means for effecting a display for urging an operator so that the illuminating means may be brought into a preparatory condition for illuminating in response to a signal indicative of the fact that said electrical image information is lower than said predetermined level being put out by said comparison means.

50. An image pick-up device according to claim 49, wherein the illuminating means includes a flashlight source.

51. An image pick-up device according to claim 50, wherein said display means includes a timer for effecting display continuously for a predetermined time.

52. An image pick-up device according to claim 50, wherein said display means effects display by light or sound.

53. An image pick-up device for use with illuminating means for illuminating an object to be photographed, said device comprising:
(a) photoelectric converting means for converting the image of the object into electrical image information;
(b) memory means for storing therein the electrical image information formed in said photoelectric converting means;
(c) transfer means for periodically transferring the electrical image information in said photoelectric converting means to said memory means;
(d) read-out means for periodically reading out the electrical image information stored in said memory means;
(e) comparison means for comparing the electrical image information read out by said read-out means with a predetermined level; and
(f) illumination controlling means for causing the illuminating means to effect illumination substantially in synchronism with the termination of the transferring operation of said transfer means when a signal indicative of the fact that said electrical image information is lower than said predetermined level is put out by said comparison means.

54. An image pick-up device according to claim 53, wherein the illuminating means includes a flashlight source.

55. An image pick-up device according to claim 53, wherein said photoelectric converting means is a light-receiving portion of a semiconductor image sensor and said memory means is a light-intercepted memory portion of said image sensor.

56. An image pick-up device according to claim 53, wherein the electrical image information formed in said photoelectric converting means is transferred to said memory means within the vertical blanking period of a standard television signal.

57. An image pick-up device for use with illuminating means for illuminating an object to be photographed, said device comprising:
(a) photoelectric converting means for converting the image of the object into electrical image information;
(b) clear means for periodically clearing the electrical image information in said photoelectric converting means.
(c) read-out means for periodically reading out the electrical image information in said photoelectric converting means;
(d) comparison means for comparing the electrical image information read out by said read-out means with a predetermined level; and
(e) illumination controlling means for causing the illuminating means to effect illumination substantially in synchronism with the termination of the clearing operation of said clear means when a signal indicative of the fact that said electrical image information is lower than said predetermined level is put out by said comparison means.

58. An image pick-up device according to claim 57, wherein the illuminating means includes a flashlight source.

59. An image pick-up device according to claim 57, wherein said clear means includes a gate for directing to a drain the electrical image information formed in said photoelectric converting means.

60. An image pick-up device according to claim 57, wherein said read-out means serves also as clear means.

61. An image pick-up system comprising:
image pick-up means for picking up the image of an object, further comprising a plurality of light-sensitive means for forming charges according to the image of the object, and charge-transfer means for transferring the charges from said plurality of light-sensitive means;
illuminating means for illuminating the object; and
inhibiting means for inhibiting illumination by said illuminating means during the transferring operation of said charge-transfer means.

62. An image pick-up system according to claim 61, wherein said image pick-up means includes a frame transfer type CCD.

63. An image pick-up system according to claim 61, wherein said image pick-up means includes an interline transfer type CCD.

64. An image pick-up system according to claim 61, wherein said illuminating means includes a flashlight source.

65. An image pick-up system comprising:
an image sensor for converting the image of an object into electrical information;
transferring means for transferring the electrical information from one location within said image sensor to another location in said image sensor;
illuminating means for illuminating the object;
controlling means for controlling the electrical information to be transferred within said image sensor after the electrical information is produced in said image sensor; and
inhibiting means for inhibiting illumination by said illuminating means while the electrical information is transferred within said image sensor by said controlling means.

66. An image pick-up system comprising:
an image sensor for converting the image of an object into electrical information;
memory means for periodically storing the electrical information from said image sensor;
read-out means for periodically reading out the electrical information from said memory means;
illuminating means for illuminating the object; and
means for making said illuminating means inoperative for illumination while the electrical information of said image sensor is moved into said memory means.

67. An image pick-up device comprising:
image pick-up means for forming the image of an object at a television scanning period;
illuminating means for illuminating the object; and
means for making said illuminating means inoperative for illumination during a television vertical blanking period.

68. An image pick-up system comprising:
an image sensor for converting the image of an object into electrical information;
transferring means for transferring the electrical information from one location within said image sensor to another location within said image sensor;
illuminating means for illuminating the object; and
means for making said illuminating means inoperative for illumination according to the initiation of transferring the electrical information within said image sensor, after said illuminating means initiates illumination according to the formation of the electrical information within said image sensor 69. An image pick-up system comprising:
An image sensor for converting the image of an object into electrical information;
transferring means for transferring the electrical information of said image sensor from one location within said image sensor to another location within said image sensor;
illuminating means for illuminating the object; and
controlling means for activating said illuminating means to illuminate the object exclusive of the period for transferring the electrical information within said image sensor.

70. An image pick-up system according to claim 69, wherein said image sensor includes a frame transfer type charge coupled device or an interline type charge coupled device.

71. An image pick-up system according to claim 69, wherein said image sensor includes a light receiving section on which light can be incident and a storage section which is shielded from light, and said controlling means causes said illuminating means to illuminate within a predetermined period of time except for a period of time during which the electrical information is transferred from said light receiving section to said storage section by said transferring means.

72. An image pick-up system according to claim 71, wherein said transferring means periodically transfers the electrical information.

73. An image pick-up system according to claim 72, wherein the transfer period of said transferring means is constant.

74. An image pick-up system according to claim 73, wherein said transfer period is in synchronism with a standard television period.

75. An image pick-up system according to claim 71, wherein said illuminating means includes a flash-light source.

76. An image pick-up system according to claim 75, further comprising variable controlling means for variably controlling the quantity of light emitted from said illuminating means.

77. An image pick-up system according to claim 76, further comprising detecting means for detecting the brightness of an object illuminated by said illuminating means.

78. An image pick-up system according to claim 77, wherein said variable controlling means performs illumination control in response to an output of said detecting means.

79. An image pick-up system according to claim 78, further comprising trigger signal generating means for generating a trigger signal for causing said illuminating means to perform illumination.

80. An image pick-up system according to claim 79 further comprising change-over means for performing change-over between first and second states, wherein in said first state, said illuminating means is triggered in response to the output from said trigger signal generating means, and in said second state, said illuminating means is not triggered.

81. An image pick-up system according to claim 80, further comprising change-over controlling means for controlling said change-over in accordance with the brightness of the object.

* * * * *

UNITED STATES PATENT AND TRADEMARK OFFICE
CERTIFICATE OF CORRECTION

PATENT NO. : 4,635,123   Page 1 of 2
DATED : January 6, 1987
INVENTOR(S) : MAKOTO MASUNAGA, ET AL.

It is certified that error appears in the above-identified patent and that said Letters Patent is hereby corrected as shown below:

COLUMN 3

Line 32, "FIG. 3 which" should read --FIG. 3, which--.

COLUMN 5

Line 45, "form" should read --from--.

COLUMN 8

Line 9, "strobo" should read --strobe--.

COLUMN 10

Line 31, "trigged" should read --triggered--.

COLUMN 15

Line 51, "said illuminating" should read --the illuminating--.

COLUMN 20 line 46, "sensor" should read -- sensor--.

UNITED STATES PATENT AND TRADEMARK OFFICE
CERTIFICATE OF CORRECTION

PATENT NO. : 4,635,123

DATED : January 6, 1987

INVENTOR(S) : MAKOTO MASUNAGA, ET AL.

It is certified that error appears in the above-identified patent and that said Letters Patent is hereby corrected as shown below:

COLUMN 20

Line 48, "An image" should read -- an image --.

COLUMN 22

Line 11, "79" should read -- 79, --.

Signed and Sealed this

Fourteenth Day of April, 1987

*Attest:*

DONALD J. QUIGG

*Attesting Officer*      *Commissioner of Patents and Trademarks*